US009630213B2

(12) United States Patent
Odajima et al.

(10) Patent No.: US 9,630,213 B2
(45) Date of Patent: Apr. 25, 2017

(54) VIBRATION ACTUATOR

(71) Applicant: Nidec Copal Corporation, Tokyo (JP)

(72) Inventors: Shin Odajima, Tokyo (JP); Yuki Shoda, Tokyo (JP); Masaaki Takagi, Tokyo (JP); Yoshihide Tonogai, Tokyo (JP)

(73) Assignee: NIDEC COPAL CORPORATION, Tokyo (JP)

( * ) Notice: Subject to any disclaimer, the term of this patent is extended or adjusted under 35 U.S.C. 154(b) by 0 days.

(21) Appl. No.: 14/502,004

(22) Filed: Sep. 30, 2014

(65) Prior Publication Data

US 2015/0148108 A1 May 28, 2015

(30) Foreign Application Priority Data

Sep. 30, 2013 (JP) ................................. 2013-204261

(51) Int. Cl.
*H04M 1/00* (2006.01)
*B06B 1/04* (2006.01)

(52) U.S. Cl.
CPC .................................... *B06B 1/045* (2013.01)

(58) Field of Classification Search
None
See application file for complete search history.

(56) References Cited

U.S. PATENT DOCUMENTS 7,078,832 B2 * 7/2006 Inagaki ................. F04B 35/045 310/12.19
2006/0087203 A1 * 4/2006 Cho ..................... H04R 25/606 310/353
2011/0012441 A1 * 1/2011 Oh .......................... B06B 1/045 310/25
2014/0270297 A1 * 9/2014 Gustafsson .......... H04R 25/606 381/326

FOREIGN PATENT DOCUMENTS

JP 2001-347227 12/2001

* cited by examiner

*Primary Examiner* — Mohammed Rachedine
(74) *Attorney, Agent, or Firm* — Troutman Sanders LLP

(57) ABSTRACT

A vibration actuator includes: a movable element that includes a magnet and moves reciprocatingly; first and second coils arranged to surround the magnet; a housing that includes a bottom portion and a lid portion that oppose each other in a movement direction of the movable element; and a plate-like magnetic body arranged at bottom portion of the housing, magnetic attraction being generated between the plate-like magnetic body and the magnet, and the movable element being drawn towards the bottom portion side.

3 Claims, 8 Drawing Sheets

VIBRATION ACTUATOR

CROSS-REFERENCE TO RELATED APPLICATION

This application claims priority under 35 U.S.C. §119 to Japanese Patent Application No. 2013-204261, filed on Sep. 30, 2013, the entire content of which being hereby incorporated herein by reference.

FIELD OF THE INVENTION

The present invention relates to a vibration actuator that causes vibration through collisions of a mover.

BACKGROUND

A conventional technology in the above field is described in, for example, Japanese Patent Application Publication No. 2001-347227 ("the JP '227"). The JP '227 describes a vibration device used in a wireless communication terminal device such as a cell phone. The vibration device houses an oscillator including a permanent magnet inside a cylinder having a coil wound thereon. The oscillator moves reciprocatingly along a central axial direction of the cylindrical body, and generates vibration by striking strike-point members arranged at both ends of the cylinder.

However, in the vibrating device of the JP '227, the oscillator can move freely within the cylinder when the coil is in a non-conducting state. Hence, depending on the relationship between the position of the oscillator when driving begins and the movement direction of the oscillator, the oscillator may sometimes fail to be moved by the leading signal component of the driving signal. In this case no vibrations are generated.

To solve this problem, it is the aspect of the present invention to provide a vibration actuator capable of reliably starting the vibration upon input of a driving signal.

SUMMARY

The vibration actuator of the present invention is characterized by the inclusion of: a movable element that includes a magnet and moves reciprocatingly; a coil arranged to surround the magnet; a housing that includes a pair of wall portions that oppose each other in a movement direction of the movable element; and a magnetic body arranged at either one of the pair of wall portions, magnetic attraction being generated between the magnetic body and the magnet, and the movable element being drawn towards a wall portion to one side.

The vibration actuator of the present invention includes a housing having a pair of wall portions. A magnetic body is arranged at one of the wall portions. A magnetic attraction force is generated between the magnetic body and the magnet, and the movable element is pulled towards the wall portion side where the magnetic body is located. As a result, when the coil is in the non-conducting state, the position of the movable element is maintained at the wall portion side where the magnetic body is located even if the orientation of the vibration actuator is changed. Hence, the relationship between the position of the movable element at the start of driving and the movement direction of the movable element is maintained. Hence, the movable element can be reliably moved by the leading signal component of the driving signal and it is possible to reliably start the vibration upon input of the driving signal.

Further, the vibration actuator is characterized in that the magnetic body is arranged at a non-opposing surface section of the wall portion that is other than an opposing surface section opposing an end surface of the movable element in the movement direction of the movable element. A size of the magnetic attraction force acting on the magnet can be adjusted using a distance between the magnet and the magnetic body. The magnetic attraction force acting between the magnet and the magnetic body includes a component that reduces the driving force. With this configuration, the distance between the magnet and the magnetic body increases, thus reducing the size of the magnetic attraction force acting on the movable element. Hence, reduction of the driving force acting on the movable element can be suppressed.

Further, the vibration actuator is characterized in that the coil receives input of a driving signal that causes the movable element to move from one wall portion where the magnetic body is arranged to the other wall portion. Inputting such a driving signal to the coil makes it possible to start the vibration upon input of a driving signal with greater reliability.

According to the vibration actuator of the present invention, vibration can be reliably started upon input of the driving signal.

BRIEF DESCRIPTION OF THE DRAWINGS

FIG. 2 is a cross-sectional perspective view illustrating the vibration actuator as seen in

FIG. 1.

DETAILED DESCRIPTION

The following is a detailed description of examples of the vibration actuator of the present invention with reference to the drawings.

Figure 1:
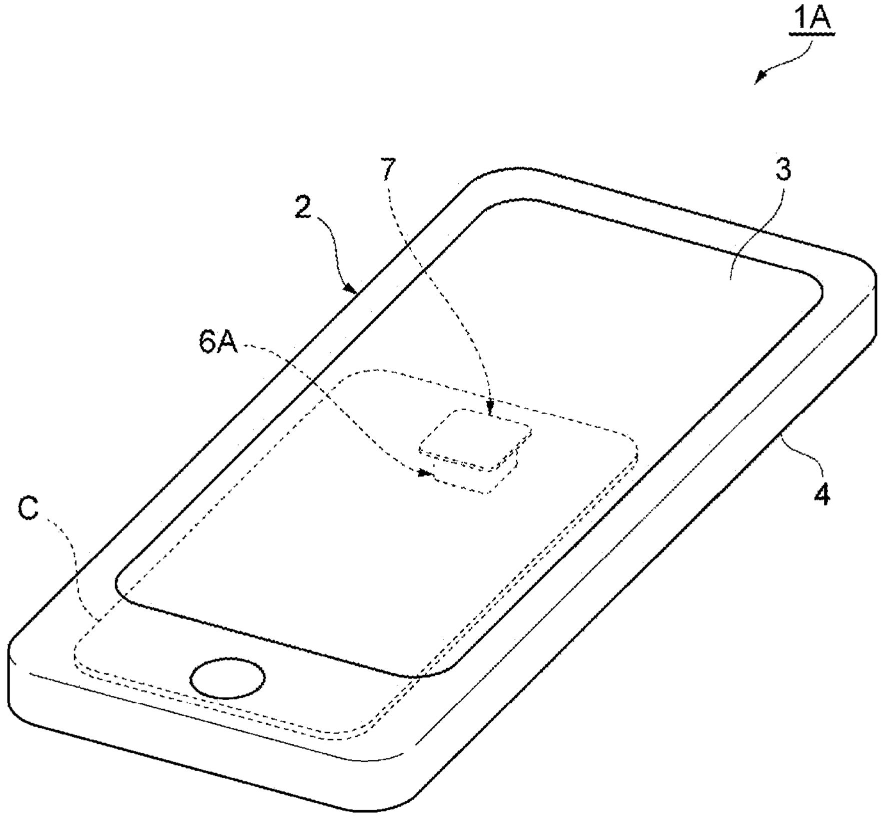
FIG. 1 is an external perspective view illustrating an information terminal processing device equipped with the vibration actuator of the present invention.

As illustrated in FIG. 1, an information terminal processing device 1A is an information terminal such as a smartphone. The information terminal processing device 1A includes a casing 2 that houses a circuit board C, a battery and the like. The casing 2 includes a touch panel 3 as a sensing panel for information display and information input and a frame 4 that surrounds the touch panel 3 and forms a strengthening member for the information terminal processing device 1A. The information terminal processing device 1A includes a vibration actuator 6A attached on a side opposite to a display screen side of the touch panel 3 and a vibration transmitter 7. The vibration actuator 6A and the vibration transmitter 7 generate vibrations to allow an operator to sense, after having touched the touch panel 3 with their fingertips, that a normal input operation has been executed.

Figure 2:
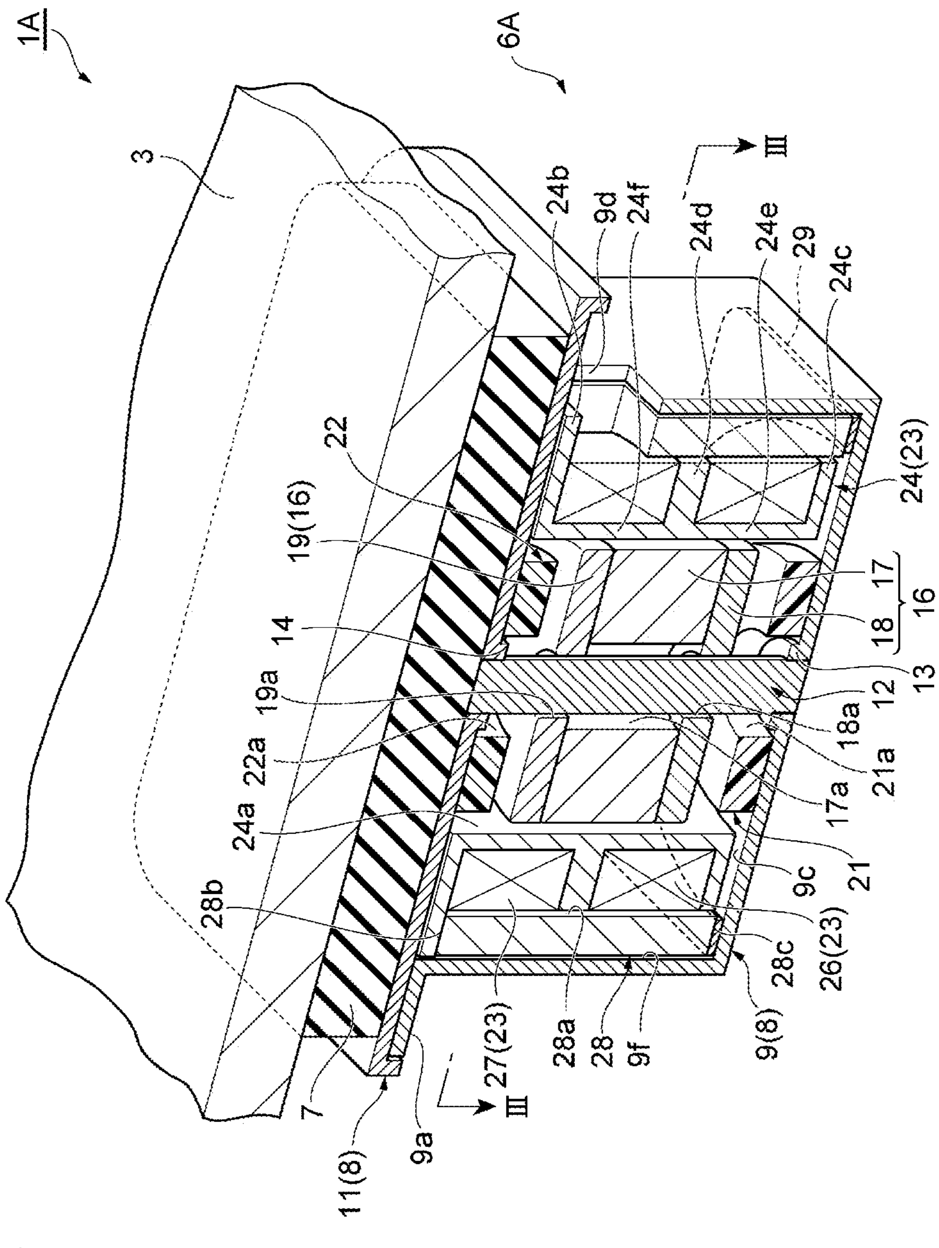
Figure 3:
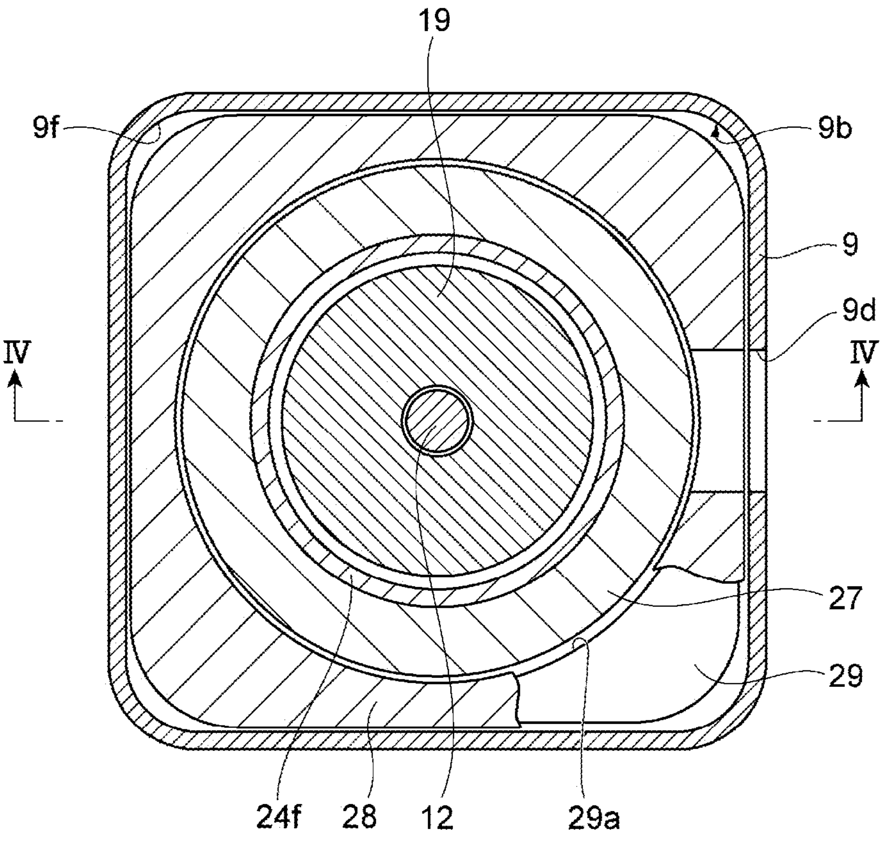
FIG. 3 is a cross-sectional view of the vibration actuator, taken through in FIG. 2.

As illustrated in FIG. 2 and FIG. 3, a housing 8 of the vibration actuator 6A includes a body case portion 9 having a substantially cuboid, box-like form and a lid portion 11 for closing an open side of the body case portion 9. The body case portion 9 and the lid portion 11 are formed from stainless steel, which is an example of a non-magnetic material. The body case portion 9 is provided with a flange portion 9*a* on the open side. The lid portion 11 closes an opening 9*b* (see FIG. 3) by being fixed to the body case portion 9 so as to cover the opening 9*b* and the flange portion 9*a*.

A guide shaft 12 is provided at a substantially central portion of the housing 8. The guide shaft 12 is arranged in such a way that an axial direction is aligned with a direction going from the lid portion 11 to a bottom portion 9*c* of the body case portion 9. The guide shaft 12 is arranged with a bottom end fitted into a fit hole 13 provided in the bottom portion 9*c* of the body case portion 9 and a top end fitted into a fit hole 14 provided in the lid portion 11. Further, the bottom portion 9*c* of the body case portion 9 and the lid portion 11 form a pair of wall portions that oppose each other in the axial direction of the guide shaft 12.

The vibration actuator 6A having a movable magnet configuration includes movable element 16 and a fixed element 23. The movable element 16 is arranged to surround the guide shaft 12 within the housing 8 so as to move reciprocatingly along the axial direction of the guide shaft 12.

The movable element 16 includes a magnet 17 that has been pole-magnetized to have a N pole and S pole in the axial direction of the guide shaft 12. The magnet 17 is provided with a through hole 17*a* extending in the axial direction and the guide shaft 12 passes therethrough. The movable element 16 includes a first yoke 18 attached at the bottom end surface of the magnet 17 and a second yoke 19 attached at the top end surface of the magnet 17. The first and second yokes 18 and 19, which have a thin circular plate form, are fixed so as to fully cover both end surfaces of the magnet 17 and so as to sandwich the magnet 17 in the axial direction of the guide shaft 12. Further, in the first and second yokes 18 and 19, guide holes 18*a* and 19*a* are formed for guiding the movable element 16 in the axial direction of the guide shaft 12 in collaboration with the guide shaft 12. Thus, the vibration direction, in which the movable element 16 moves reciprocatingly in a linear manner, matches the axial direction of the guide shaft 12.

Since the movable element 16 includes the magnet 17 and the first and second yokes 18 and 19, the mass of the movable element 16 can be increased, thus increasing the momentum generated by the movement of the movable element 16.

Figure 4:
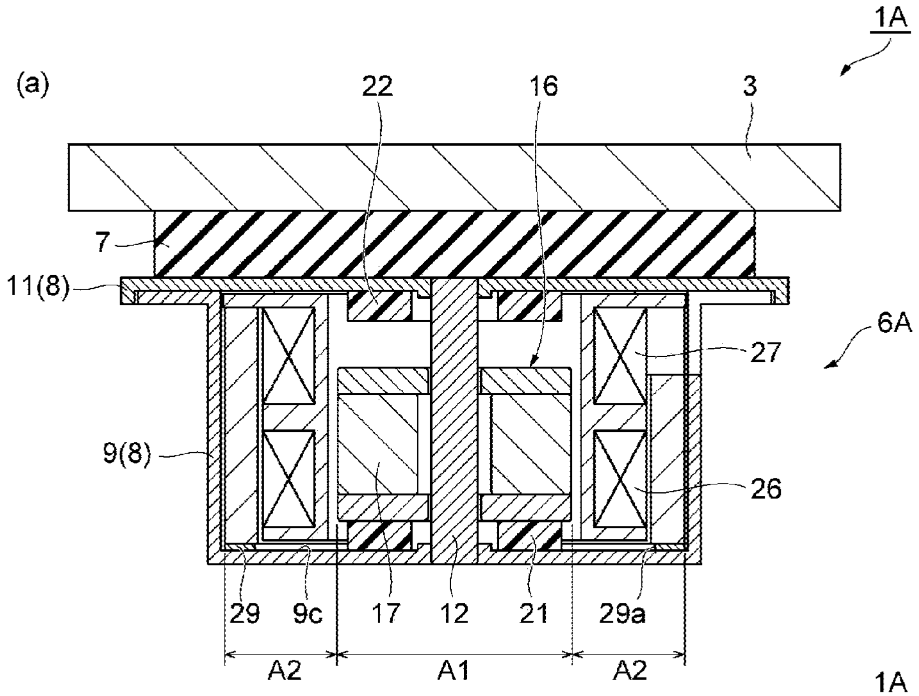
FIG. 4 is a cross-sectional view of the vibration actuator, taken through IV-IV in FIG. 3.
Figure 4:
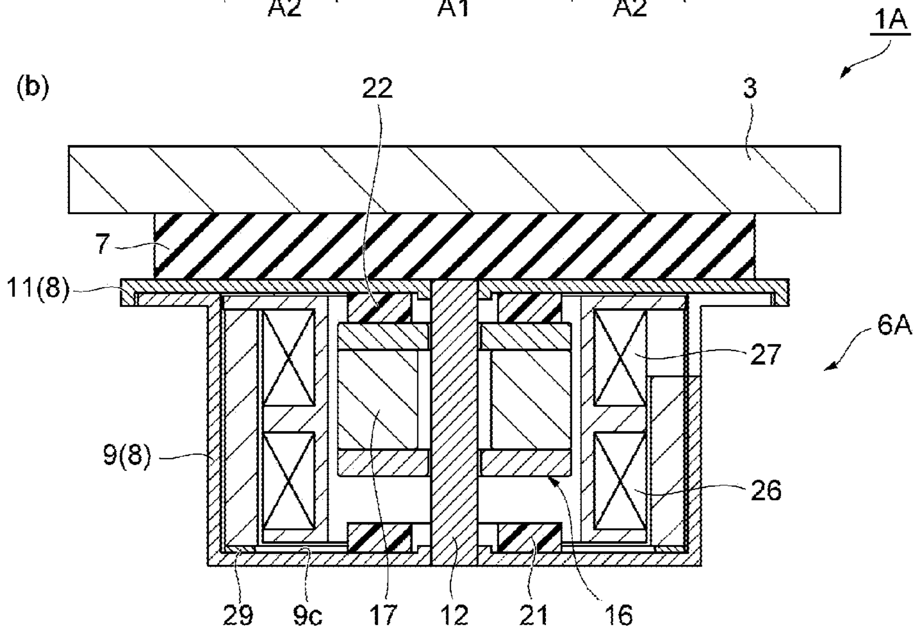

At the bottom portion 9*c* of the body case portion 9, a cushion 21 is attached to an opposing surface section A1 (see FIG. 4(*a*)) that opposes the first yoke 18 in the axial direction of the guide shaft 12. In the lid portion 11, a cushion 22 is attached at a section that opposes the second yoke 19 in the axial direction of the guide shaft 12. The cushions 21 and 22 have an annular form including the holes 21*a* and 22*a* which are pierced by the guide shaft 12. With the cushion 22, the magnet 17 can be protected from impacts. According to the cushion 22, the sound of the impact generated upon impact can be reduced.

The fixed element 23 is arranged in the housing 8 so as to surround the movable element 16. The fixed element 23 includes a bobbin 24. The bobbin 24 includes an opening

24*a* that extends in the axial direction of the guide shaft 12, an upper side flange portion 24*b* provided on the lid portion 11 side, a lower side flange portion 24*c* provided on the bottom portion 9*c* side, and a partition portion 24*d* provided between the upper side flange portion 24*b* and the lower side flange portion 24*c*. A first bobbin portion 24*e* is formed between the lower side flange portion 24*c* and the partition portion 24*d*, and a second bobbin portion 24*f* is formed between the upper side flange portion 24*b* and the partition portion 24*d*. The first and second bobbins 24*e* and 24*f* are aligned in the axial direction of the guide shaft 12.

The fixed element 23 includes two coils 26 and 27, which are connected in series. The first coil 26 is formed by winding coil wire on the first bobbin portion 24*e* to correspond with the first yoke 18. The second coil 27 is formed by winding coil wire on the second bobbin portion 24*f* to correspond with the second yoke 19. The first and second coils 26 and 27 are aligned in the axial direction of the guide shaft 12. Winding directions of the coil wires oppose each other, and the end portions of the coil wire are pulled out to the exterior of the housing 8 via pull-out holes 9*d* provided on a side surface of the body case portion 9.

Within the housing 8, a weight 28 is arranged so as to fill a space between the first and second coils 26 and 27 and an inner wall surface 9*f* of the body case portion 9. The upper side flange portion 24*b* of the bobbin 24 contacts an upper end surface 28*b* of the weight 28 in the axial direction of the guide shaft 12, the weight 28 being pressed towards the bottom portion 9*c* of the body case portion 9 by the upper side flange portion 24*b* and thus fixed in place. The weight 28, which has a point-symmetrical form about the guide shaft 12, includes circular opening 28*a* through which the bobbin 24 and the first and second coils 26 and 27 can be inserted. The weight 28 is arranged within the housing 8 so that a center of gravity of the weight 28 is positioned on the axis of the guide shaft 12. The weight 28 is formed from a material having a comparatively high density (such as tungsten).

According to the weight 28, the entire mass of the vibration actuator 6A is increased, and a resonant frequency of the vibration system configured from the vibration actuator 6A and the vibration transmitter 7 is lowered. Hence, the frequency of the vibration generated through the impacts can be reduced.

A plate-like magnetic body 29 is interposed between the bottom portion 9*c* that forms one of the wall portions of the pair of wall portions, and a lower end surface 28*c* of the weight 28 in the axial direction of the guide shaft 12. The plate-like magnetic body 29, which is an iron plate of a rectangular thin-plate form, has formed therein an opening 29*a* (see FIG. 4(*a*)) that exposes at the bottom portion 9*c* the entire opposing surface section A1 that opposes the movable element 16. Hence, the plate-like magnetic body 29 is not arranged on the opposing surface section A1. On the other hand, the plate-like magnetic body 29 is arranged on a non-opposing surface section A2 that does not oppose the end surface of the movable element 16, and is outside the opposing surface section Al of the bottom portion 9*c*.

The vibration transmitter 7 formed from an elastic member is interposed between the vibration actuator 6A and the touch panel 3. The vibration transmitter 7 is attached to the vibration actuator 6A and the touch panel 3. The vibration transmitter 7 reduces the frequency of the vibrations generated by the vibration actuator 6A to a frequency band of 150 Hz to 500 Hz in which vibrations are easily felt by the operator. As a consequence, the waveform of the vibration is converted from an impact waveform having sharp peaks to a waveform that approaches sinusoidal vibration, and transmitted to the touch panel 3. For the vibration transmitter 7, it is especially preferable to use a rubber member having a density of 0.3 to 1.0 g/cm$^3$.

Next, operations of the information terminal processing device 1A will be described.

When the touch panel 3 is not being touched by the operator, no driving pulse signal is input to the first and second coils 26 and 27, and the first and second coils 26 and 27 are in a non-conducting state. At this time, as illustrated in FIG. 4(*a*), the movable element 16 is attracted to the bottom portion 9*c* side of the body case portion 9 by the magnetic attraction force generated between the plate-like magnetic body 29 and the magnet 17.

When the touch panel 3 is touched by the operator and a data input is judged to have been successfully executed, a control unit (not shown in the drawings) inputs a driving pulse signal to the first and second coils 26 and 27. The driving pulse signal is set to a frequency in the region of (within a few hundred Hz of) the resonant frequency of the touch panel 3. Setting the frequency of the driving pulse signal to be near the resonant frequency of the touch panel 3 allows the vibration amplitude of the touch panel 3 to be increased through the phenomenon of resonance. Further, the driving pulse signal is set so that current flows in a direction that causes the movable element 16 to move from the bottom portion 9*c*, where the plate-like magnetic body 29 is arranged, towards the lid portion 11 side.

Figure 5:
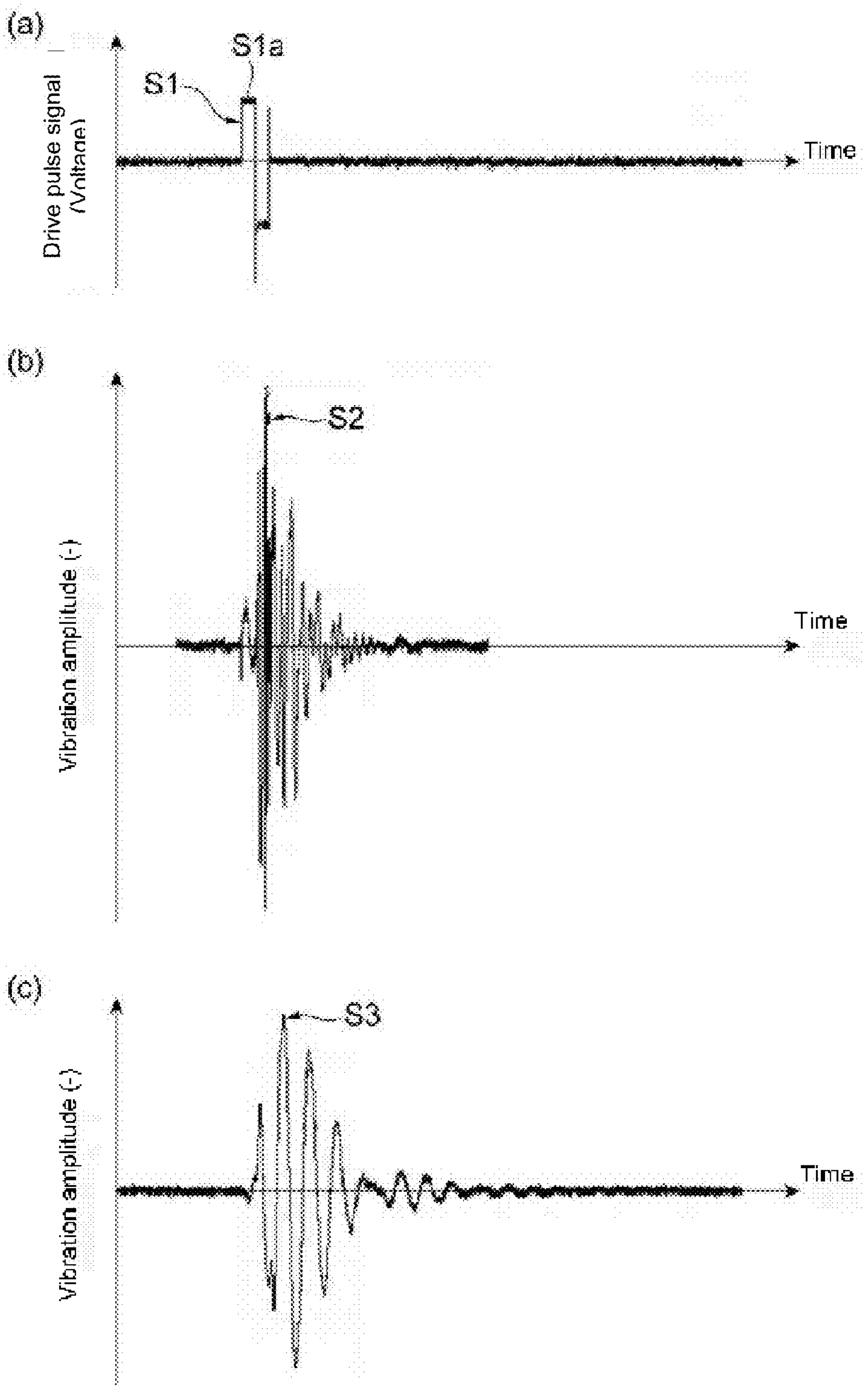
FIG. 5 is a graph illustrating a waveform of a driving pulse signal and a waveform of vibration transmitted to a touch panel.

As illustrated in FIG. 4(*b*), when the driving pulse signal is input to the first and second coils 26 and 27, the leading signal component S1*a* (see FIG. 5(*a*)) included in the driving pulse signal causes the movable element 16 to move along the axial direction of the guide shaft 12 towards the lid portion 11 and collides with the cushion 22 of the lid portion 11. As a result of the impact, the entire vibration actuator 6A moves along the axial direction, generating vibration waves that are transmitted to the touch panel 3 via the vibration transmitter 7. When the vibration wave transmitted to the touch panel 3 is sensed by the operator, the operator is able feel that an operation has been performed.

The vibration actuator 6A includes a housing 8 having the bottom portion 9*c* and the lid portion 11. At the bottom portion 9*c*, the plate-like magnetic body 29 is provided. A magnetic attraction force is generated between the plate-like magnetic body 29 and the magnet 17, and the movable element 16 is pulled towards the bottom portion 9*c* side where the plate-like magnetic body 29 is provided. As a result, when the first and second coils 26 and 27 are in the non-conducting state, even if the orientation of the vibration actuator 6A is changed, the position of the movable element 16 is constantly maintained at the bottom portion 9*c* side where the plate-like magnetic body 29 is located. Hence, the relationship between the position of the movable element 16 at the start of driving and the movement direction of the movable element 16 is maintained.

Hence, the movable element 16 is reliably and linearly moved by the leading signal component S1*a* included in the driving pulse signal and the vibration can be reliably started upon input of the driving pulse signal.

Further, the plate-like magnetic body 29 is arranged on the non-opposing surface section A2 of the bottom portion 9*c*, which is outside the opposing surface section A1 that opposes an end surface 16*a* of the movable element 16 in a movement direction of the movable element 16. The size of the magnetic attraction force acting on the magnet 17 can be adjusted using the distance between the magnet 17 and the plate-like magnetic body 29. The magnetic attraction force acting between the magnet 17 and the plate-like magnetic body 29 includes a component that reduces the driving force generated by the cooperation of the first and second coils 26 and 27 and the magnet 17. With this configuration, the distance between the magnet 17 and the plate-like magnetic body 29 increases, thus reducing the size of the magnetic attraction force acting on the movable element 16. Hence, reduction of the driving force acting on the movable element 16 can be suppressed.

Further, the first and second coils 26 and 27 receive input of a driving signal that causes the movable element 16 to move from the bottom portion 9*c*, where the plate-like magnetic body 29 is arranged, towards the lid portion 11. Inputting a driving signal of this type to the first and second coils 26 and 27 allows the vibration to be started with even greater reliability upon input of the driving signal.

Also, since the vibration actuator 6A generates vibrations through collision of the movable element 16 with the housing 8, it is possible to generate vibrations with a high level of responsiveness to operations on the touch panel 3. Moreover, since the information terminal processing device 1A has the vibration transmitter 7 sandwiched between the vibration actuator 6A and the touch panel 3, the frequency of the vibration generated by the impacts is reduced in transmission of the vibration to the touch panel 3. Thus, according to the information terminal processing device 1A, it is possible to make the touch panel 3 vibrate in a way that is easily sensed by the operator and with a high level of responsiveness.

Here, to confirm the effects of the information terminal processing device 1A, the information terminal processing device 1A and an information terminal processing device relating to a comparative example that did not include the weight 28 and had the vibration actuator directly attached to the touch panel 3 were manufactured, and the waveforms of the vibrations transmitted to the touch panel 3 in each case were checked. Note that driving pulse signals of the same amplitude and the same frequency were input to the information terminal processing device 1A and to the information terminal processing device according to the comparative example. Specifically, as illustrated in FIG. 5(*a*), the driving pulse signal 51 was set to be one period at a frequency of 440 Hz.

As shown in FIG. 5(*b*), the vibration waveform S2 transmitted to the touch panel 3 in the information terminal processing device according to the comparative example was confirmed to have a high frequency and a plurality of sharp peaks.

On the other hand, as shown in FIG. 5(*c*), when the vibration actuator 6A including the weight 28 was attached to the touch panel 3 via the vibration transmitter 7, a near-sinusoidal vibration waveform S3 of a frequency lower than the vibration waveform S2 of the comparative example shown in FIG. 5(*b*) was confirmed. Thus, it was found that vibrations that are easily sensed by the operator could be generated with the information terminal processing device 1A whose mass has been increased by providing the weight 28 in the vibration actuator 6A and in which the vibration actuator 6A is attached to the touch panel 3 via the vibration transmitter 7.

Further, since the information terminal processing device 1A generates vibrations by causing the movable element 16 to collide with the cushion 22, the time to start and stop the vibration actuator was shorter than in the case of vibration actuator in which an eccentric weight was attached to rotating motor (comparative example 1) or in the case of a vibration actuator in which spring resonance was used (comparative example 2). Moreover, although response speed can be increased using a vibration actuator that employs a piezoelectric device (comparative example 3), a large piezoelectric device is required to obtain a vibration amplitude that can be felt by the operator.

By contrast, with the information terminal processing device 1A of the present example, the vibration actuator employing the piezoelectric device can be reduced in size compared to the vibration actuator that employs the piezoelectric device (comparative example 3).

The present invention is not limited to the above-described examples, and the following modifications are possible without departing from the spirit of the present invention.

Figure 6:
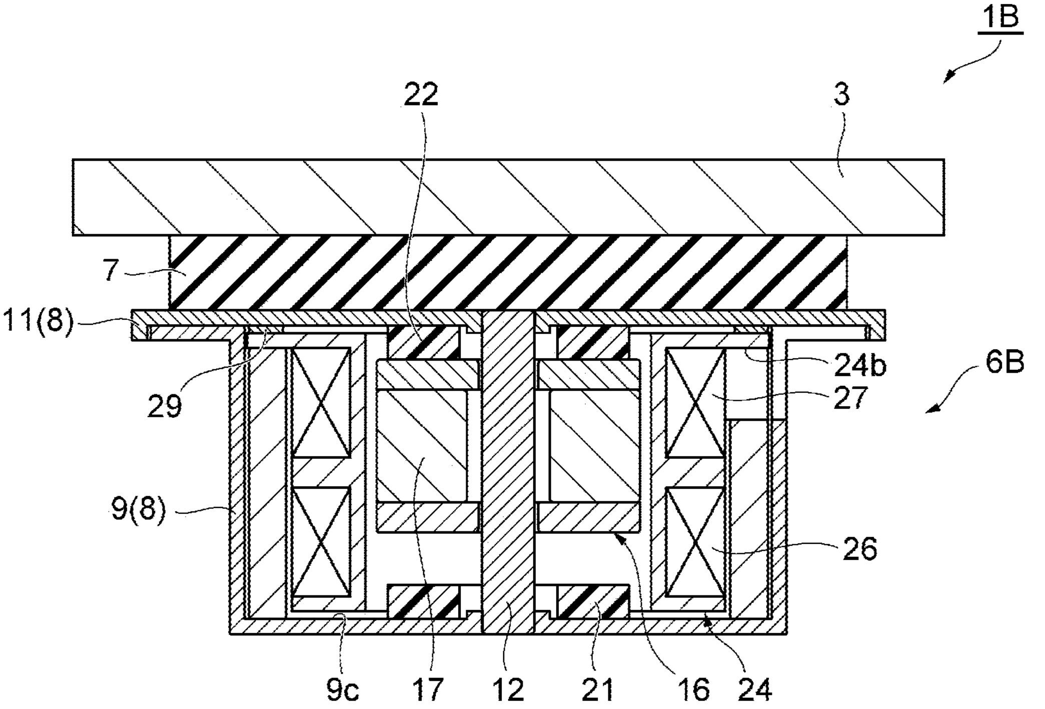
FIG. 6 is a cross-sectional view illustrating a vibration actuator of a first modification example.

As illustrated in FIG. 6, an information terminal processing device 1B may include a vibration actuator 6B according to a first modification example. In the vibration actuator 6B, the plate-like magnetic body 29 is provided sandwiched between the upper side flange portion 24*b* of the bobbin 24 and the lid portion 11. According to this configuration, the position of the movable element 16 in the non-conducting state can be set to be on the lid portion 11 side. Thus, the position of the movable element 16 in the non-conducting state can be set to the bottom portion 9*c* side (see FIG. 4(*a*)) or the lid portion 11 side depending on the orientation of attachment and vibration direction of the vibration actuator 6A to the touch panel 3.

Figure 7:
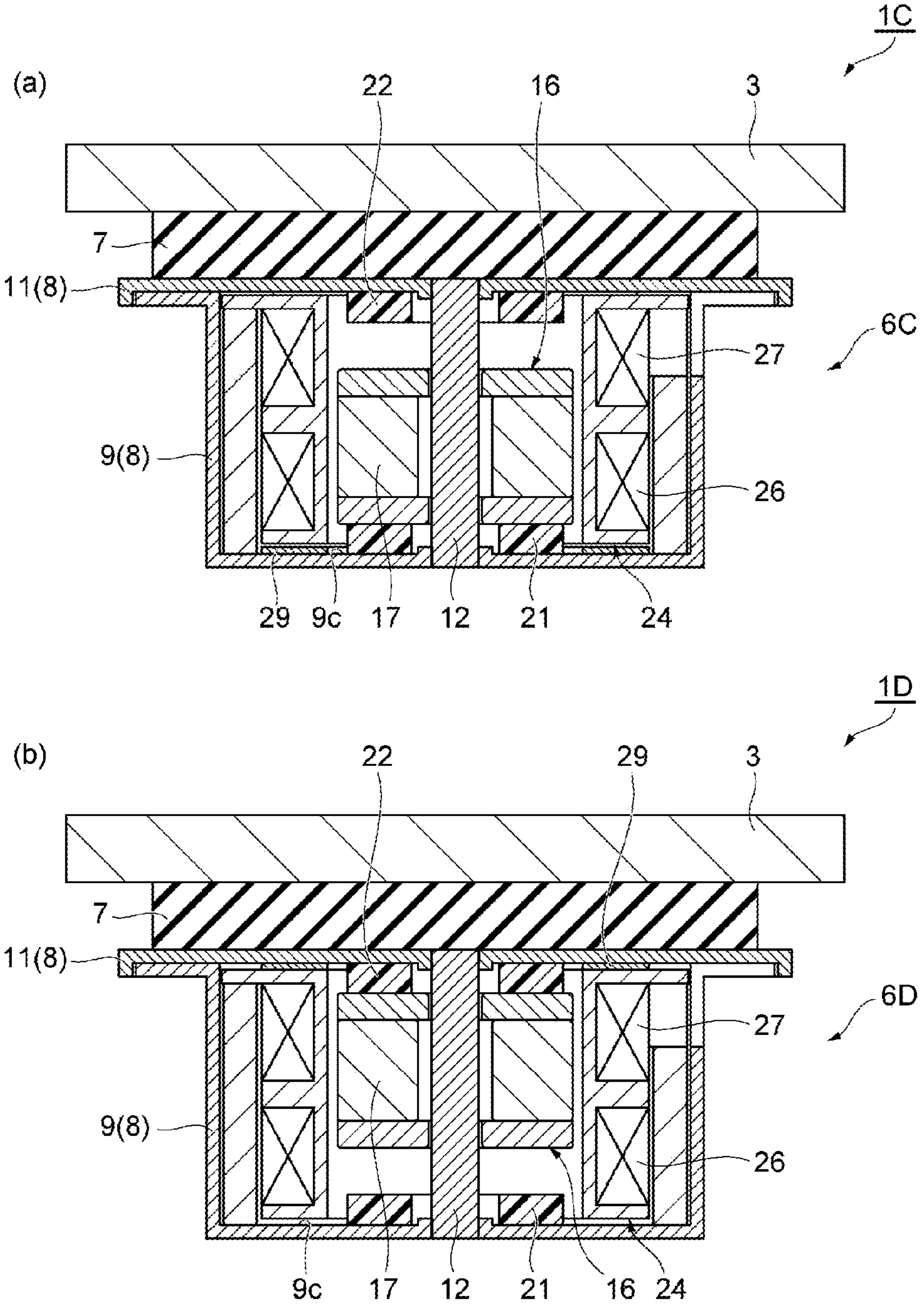
FIG. 7 is a cross-sectional view illustrating vibration actuators of second and third modification examples.

Moreover, as illustrated in FIG. 7(*a*), an information terminal processing device 1C may include a vibration actuator 6C according to a second modification example. In the vibration actuator 6C, the plate-like magnetic body 29 is provided between the bottom portion 9*c* and the first coil 26. Moreover, as illustrated in FIG. 7(*b*), an information terminal processing device 1D may include a vibration actuator 6D according to a third modification example. In the vibration actuator 6D, the plate-like magnetic body 29 is provided between the lid portion 11 and the second coil 27.

With the vibration actuators 6C and 6D, the magnetic attraction force acting on the movable element 16 is increased in order to reduce the distance between the plate-like magnetic body 29 and the magnet 17 compared with the case in which the plate-like magnetic body 29 opposes the weight 28.

Thus, even if the information terminal processing device 1C or 1D is subjected to a forceful exterior vibration or impact, the movable element 16 can be reliably attracted to the bottom surface 9*c* side or lid portion 11 side when the first and second coils 26 and 27 are in the non-conducting state.

Figure 8:
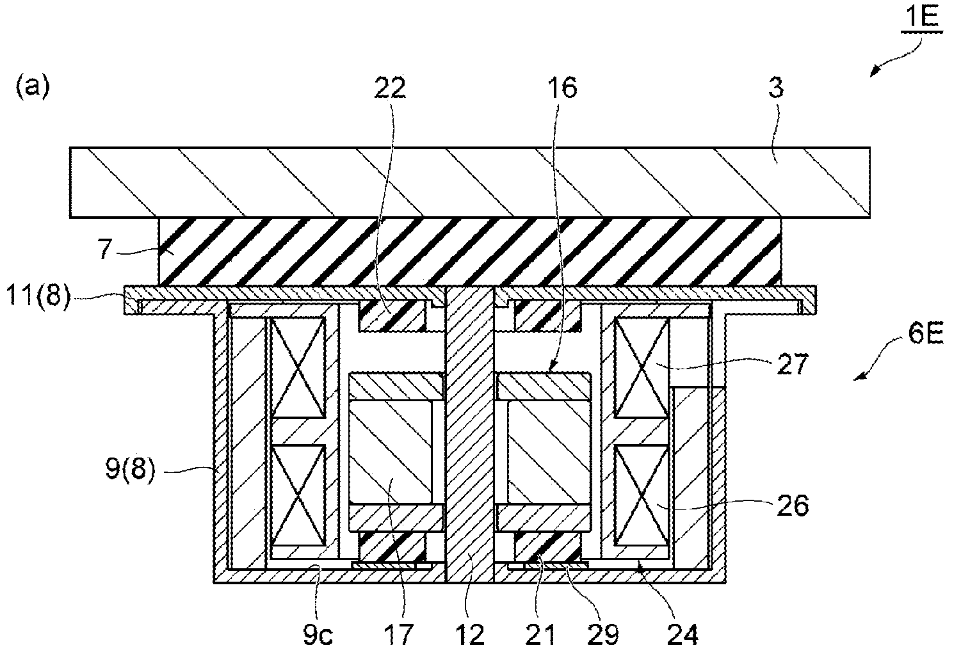
FIG. 8 is a cross-sectional view illustrating vibration actuators of fourth and fifth modification examples.
Figure 8:
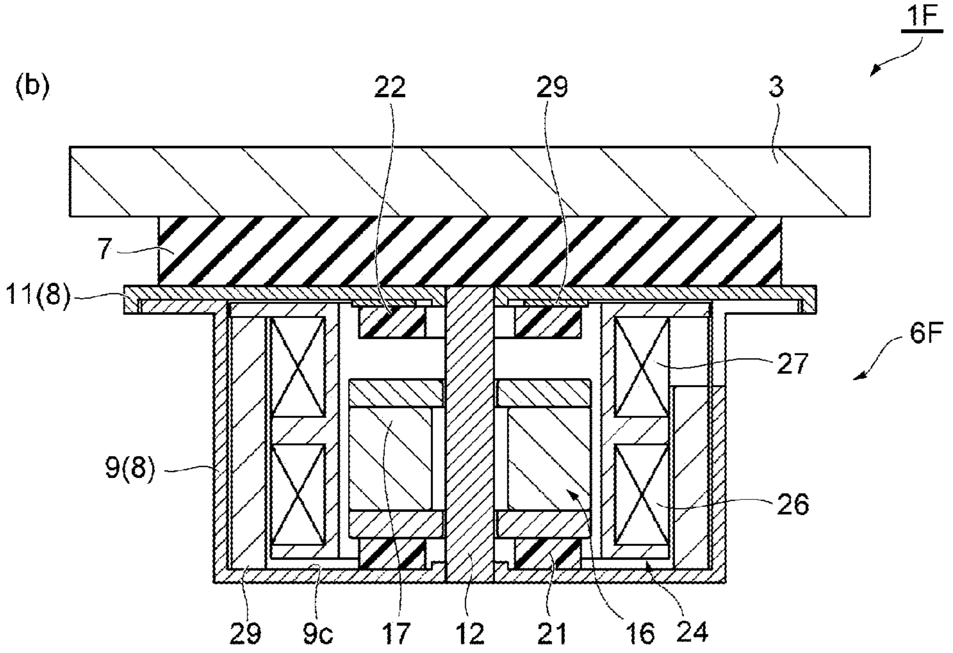

Further, as illustrated in FIG. 8(*a*), an information terminal processing device 1E may include a vibration actuator 6E according to a fourth modification example. In the vibration actuator 6C, the plate-like magnetic body 29 is provided between the bottom portion 9*c* and the cushion 21. Moreover, as illustrated in FIG. 8(*b*), an information terminal processing device 1F may include a vibration actuator 6F according to a fifth modification example. In the vibration actuator 6F, the plate-like magnetic body 29 is provided between the lid portion 11 and the cushion 22.

With the vibration actuators 6E and 6F, the magnetic attraction force acting on the movable element 16 is increased even further in order to further reduce the distance between the plate-like magnetic body 29 and the magnet 17. Thus, even if the information terminal processing device 1 E or 1F is subjected to a forceful exterior vibration or impact, the movable element 16 can be even more reliably attracted to the bottom surface 29*c* side or lid portion 11 side when the first and second coils 26 and 27 are in the non-conducting state.

The weight 28 in any of the vibration actuators 6A to 6F may be provided on the movable element 16. Alternatively, vibration actuators 6A to 6F may be provided not with the guide shaft 12 but with a cylindrical movable element. With the cylindrical movable element 16, there is no longer any contact between the guide holes 18*a* and 19*a* of the movable element 16 (see FIG. 2) and the guide shaft 12. As a result, it is possible to increase the speed of movement of the movable element 16 and thereby increase the momentum of the movable element 16.

Further, after moving from the bottom portion 9*c* side to the lid portion 11 side of the housing 8 and colliding with the cushion 22 on the lid portion 11, the movable element 16 may further be driven to the bottom portion 9*c* side and caused to collide with the cushion 21 on the bottom portion 9*c*. Moreover, the movable element 16 may be caused to move reciprocatingly between the cushion 21 and the cushion 22 to generate multiple collisions.

Alternatively, vibration actuators 6A to 6F may, in place of the guide shaft 12, be provided with a guide cylinder (not shown in the drawings) that houses the movable element 16 or 16B and guides in the movable element 16 in the vibration direction.

Further, the number of coils of the vibration actuators 6A to 6F is not limited to being 2 and may alternatively be 1, or more than 2. Moreover, the cushions 21 and 22 of the vibration actuators 6A to 6F may attached to the top surface of the second yoke 19 and the bottom surface of the first yoke 18, respectively.

The information terminal processing devices 1A to 1F are not limited to being used in a communications terminal such as a cellphone or a smartphone, but may be used in other devices including a touch panel 3, such as vending machines, ticketing machines, personal computers and information kiosks.

Moreover, although the example was described as having as the sensing panel a panel that is touched directly, the sensing panel may be a panel operated from close proximity. Alternatively, the sensing panel may be a panel that is operated by direct contact or from close proximity using a pen-type input means. Further, a plurality of vibration patterns can be achieved by arranging a plurality of the vibration actuators 6A and 6B in the device.

EXAMPLES

The following describes materials that can be preferably employed as the elastic member used in the vibration transmitter 7.

In the present invention, preferable materials for the vibration transmitter 7 include: Styrene gel (KG gel made by Kitagawa Industries Co., Ltd., model number: YMG90V, density: 1.29 g/cm$^3$); Silicone gel (silicone film made by Taika Co. Ltd., model number: θ-7, density: 1.06 g/cm$^3$); and urethane foam (made by Inoac Co. Ltd, model number: SR-S 15P, density: 0.15 g/cm$^3$). According to the vibration transmitter 7 made from these materials, the frequency of the vibrations transmitted to the touch panel 3 can be lowered in comparison to the case in which the vibration actuator 6A is directly attached to the touch panel 3.

In the present invention, more preferable materials for the vibration transmitter 7 include: natural rubber (density 0.93 g/cm$^3$), Styrene gel (KG gel made by Kitagawa Industries Co., Ltd., model number: YMG80BK, density: 0.87 g/cm$^3$);

and urethane foam (made by Inoac Co. Ltd, model number: WP-32P, density: 0.32 g/cm$^3$, model number: WP-40P, density: 0.40 g/cm$^3$, and model number: SR-S48P, density: 0.48 g/cm$^3$). According to the vibration transmitter 7 made from these materials, the frequency of the vibrations transmitted to the touch panel 3 can be lowered in comparison to the case in which the vibration actuator 6A is directly attached to the touch panel 3. In addition it is possible to suppress the amplitude of the vibration to ensure a vibration amplitude that is suitable for sensing by the operator.

On the other hand, ether-based polyurethanes (Sanshinkosan Co., Ltd., model number: Sorbo S, density: 1.38 g/cm$^3$) or (Sanshinkosan Co., Ltd., model number: Sorbo M, density: 1.38 g/cm$^3$) increase the frequency of the vibration transmitted to the touch panel 3 in the same way as in the case in which the vibration actuator 6A is directly attached to the touch panel 3, and are not therefore suitable.

The invention claimed is:

1. A vibration actuator comprising:

a movable element that includes a magnet and moves reciprocatingly;

a coil arranged to surround the magnet;

a housing that houses the movable element and the coil and includes a first wall portion and a second wall portion, where the first wall portion opposes the second wall portion in a movement direction of the movable element; and a magnetic body fixed to the first wall portion and configured to draw the movable element towards the first wall portion by magnetic attraction generated between the magnetic body and the magnet.

2. The vibration actuator according to claim 1, wherein the magnetic body is arranged at a non-opposing surface section of the first wall portion that is other than an opposing surface section of the first wall portion opposing an end surface of the movable element in the movement direction of the movable element.

3. The vibration actuator according to claim 1, wherein the coil receives input of a driving signal that causes the movable element to move from the first wall portion to the second wall portion.

* * * * *